United States Patent [19]

Hirbod

[11] 4,266,403
[45] May 12, 1981

[54] WIND AND WAVE ENERGY GENERATOR

[76] Inventor: Farrokh Hirbod, 6424 Via Colinita, Rancho Palos Verdes, Calif. 90274

[21] Appl. No.: 89,679

[22] Filed: Oct. 30, 1979

[51] Int. Cl.³ .......................... F03B 13/12; F03D 9/00
[52] U.S. Cl. ........................................ 60/698; 60/398; 60/497
[58] Field of Search .................... 60/398, 698, 497; 290/53, 55

[56] References Cited

U.S. PATENT DOCUMENTS 4,098,081  7/1978  Woodman .................... 60/698 X

Primary Examiner—Allen M. Ostrager
Attorney, Agent, or Firm—Nilsson, Robbins, Dalgarn, Berliner, Carson & Wurst

[57] ABSTRACT

An apparatus and method of harnessing combined wind and wave energy for generating, e.g., electrical power which includes a first housing held at a fixed height above the bottom of a body of water and having an internal cavity, and a buoyant second housing having an internal cavity surrounded by sleeves into which the walls of the internal cavity of the first housing are slidably contained for allowing relative movement between the first and second housings in response to wave action, with the first body containing a plurality of funnel-like openings for receiving air driven by the wind and directing it through at least one set of turbine blades, and also with the internal cavity of the second housing having a flapper valve which is normally open to the fluid communication between the internal cavities when the wave action moves the second housing upwardly from the first housing, and which closes in response to the downward movement of the second housing with respect to the first housing as the wave passes by, thereby pumping air trapped in the internal cavity across the blade of a second set of turbines, with the discharge of this second set of turbines supplying air to assist in turning the first set of turbines.

6 Claims, 3 Drawing Figures

WIND AND WAVE ENERGY GENERATOR

BACKGROUND OF THE INVENTION

This invention relates generally to a novel apparatus for generating energy by simultaneously using the energy available in both the wind and the wave action on a body of water. More particularly, the invention concerns an apparatus for harnessing both wind and wave energy comprising a housing which is fixed at a preselected height above the bottom of the body of water and below the surface of the water, and which has an inner cavity having an outer tubular wall and a tubular inner wall defining therebetween an inner chamber and an outer chamber. Also included is a second buoyant housing which also has an internal cavity defined by a tubular outer wall and a tubular inner wall dividing this inner cavity also into an inner chamber and an outer chamber, with the tubular outer wall of the first housing extending upwardly and into a sleeve surrounding the tubular outer wall of the second buoyant housing and in slidably sealing engagement within that sleeve. The inner walls of the cavities in the upper and lower housings are also in slidably sealing contact to thereby connect the inner and outer chambers of the upper and lower housings. The upper housing has at least one inlet passage which directs the wind across the blades of at least one turbine contained in the upper housing with the turbine discharge into the inner chamber of the upper housing and through the inner chamber of the lower housing where it is directed across the blades of at least one turbine contained in the bottom of the inner cavity of the lower housing. The discharge from the at least one turbine in the lower housing is directed through the outer chambers of the lower housing and upper housing onto the blades of the at least one turbine in the upper housing. Further, wave action causes the upper housing to move up and down relative to the lower housing and a one way flow valve, e.g., a flapper valve, contained in the inner chamber of the upper housing shuts upon downward motion of the upper housing to cause a pumping action on the air thus trapped in the inner chamber of the lower housing which begins decreasing in volume, thereby assisting in driving the turbines in the lower housing, and increasing the discharge pressure from those turbines, which in turn is fed to the turbines in the upper housing.

In the past it has been common to use wind energy to generate power, e.g., generating electrical power, and also to use the energy contained in wave motion of a body of water to generate power. However, no apparatus exists in the art for utilizing the wind to generate power and utilizing wave motion to supplement the wind pressure for driving the generating means to increase the amount of useful energy obtainable from the wind.

The problems enumerated in the foregoing are not intended to be exhaustive, but rather are among many which intend to impair the effectiveness of previously known power generators utilizing natural forces, e.g., wind and wave energy. Other noteworthy problems may also exist; however, those presented above should be sufficient to demonstrate that natural forces energy generators appearing in the art have not been altogether satisfactory in the utilization of the energy contained in both the wind and the waves.

SUMMARY OF A PREFERRED EMBODIMENT OF THE INVENTION

Recognizing the need for an improved energy generator utilizing natural forces, i.e., wind action and wave motion, it is, therefore, a general feature of the present invention to provide a novel natural forces energy generator which minimizes or reduces the problems of the type previously noted.

A feature of the present invention includes utilizing the energy contained in the wind to drive at least one turbine, and utilizing the energy contained in the waves on a body of water to cause relative motion between portions of the apparatus of the present invention, which, in conjunction with proper valving, causes a pumping action within internal cavities cavities of the apparatus of the present invention to supplement the driving force of the wind on at least one set of turbines contained within the apparatus of the present invention.

Another feature of the present invention resides in the placement of a second set of at least one turbine blade within the internal cavity which is driven by the air pressure flow discharging from the first set of at least one turbine and which is also supplemented by the pumping action.

Yet another feature of the present invention resides in at least one auxiliary turbine which is driven by a pumping action created by a relative motion between a sliding member driven by wave action to move up and down relative to the second housing and which also thereby creates a suction at the discharge of the at least one set of turbine blades in the upper housing to assist in driving that at least one set of turbine blades.

Examples of the more important features of this invention have thus been summarized somewhat broadly in order that a detailed description thereof that follows may be better understood, and in order that the contribution to the art may be better appreciated. There are, of course, additional features of the invention that will be described hereafter and which will also form the subject of the appended claims.

DETAILED DESCRIPTION OF A PREFERRED EMBODIMENT OF THE INVENTION

Figure 1:
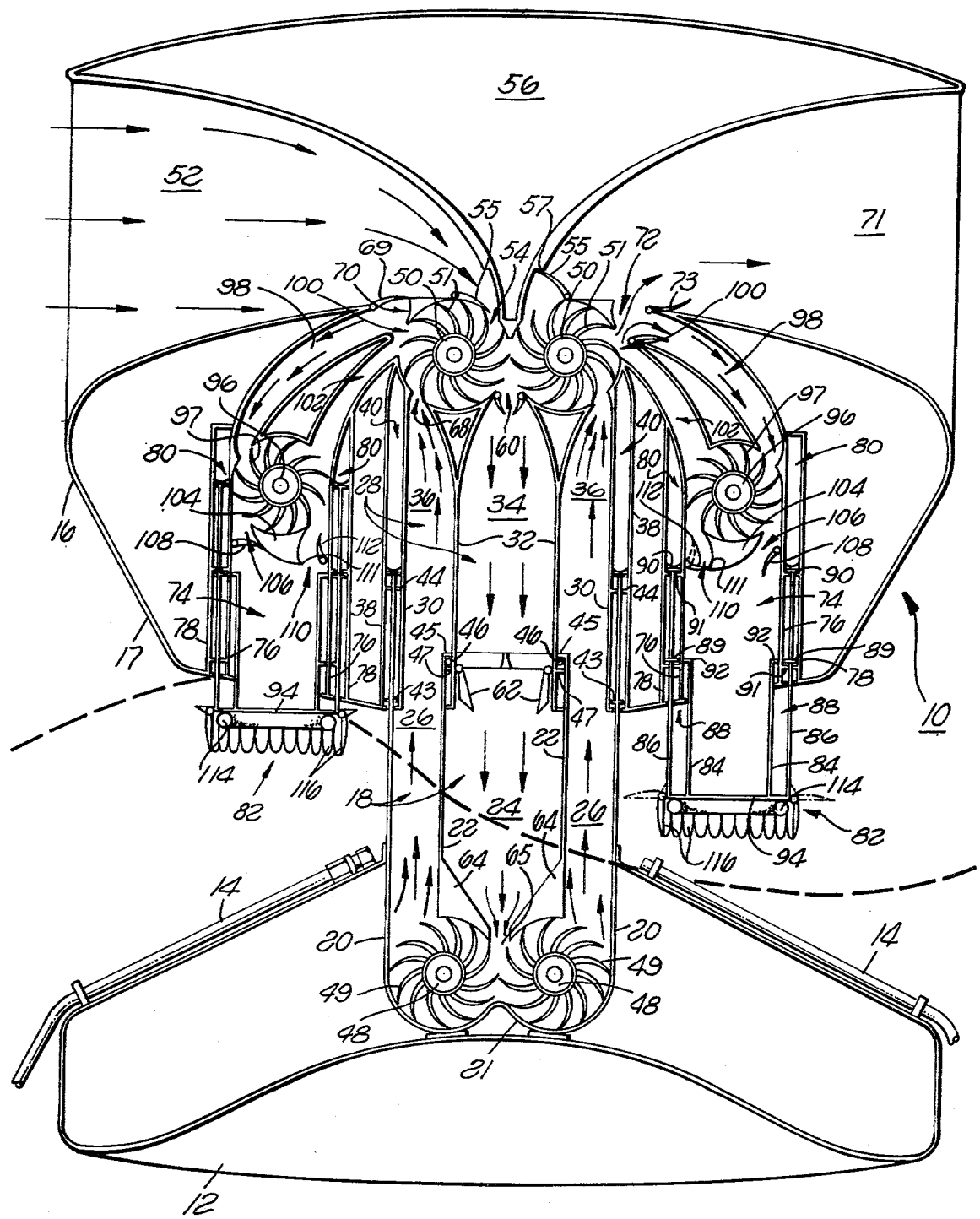
FIG. 1 is a side elevational view of the present invention partially cut away to show in cross section the internal components of the present invention during one phase of operation of the present invention.

Turning first to FIG. 1, a wind and wave energy power generator generally designated as 10 according to the present invention is shown.

The wind and wave energy power generator 10 has a first or lower housing 12 which is fixed to some preselected distance above the floor of the body of water in which the power generator 10 is placed, by e.g., making lower housing 12 hollow and buoyant and anchoring it to the bottom by a plurality of cables 14, or by simply mounting the lower housing 12 on the bottom by some suitable means, not shown, but well known in the art.

The power generator 10 also includes a second or upper housing 16. The shape of the side walls 17 of the upper housing 16 is specifically designed by being slanted inwardly and downwardly towards the bottom of the upper housing to maximize the upward lifting thrust of the wave on the upper housing 16 as the wave strikes the side 17 of upper housing 16, as will be more fully described below. In addition, when the wave action is relatively small, wind striking these side walls 17 will have some lifting effect on the upper housing 16 to assist the waves in pushing the upper housing 16 upwardly with respect to the lower housing 12. The lower housing 12 has an inner cavity 18 defined by a first tubular outer wall 20 and a bottom 21. Tubular is used throughout this application in the sense of an elongated enclosure, and the particular shape of the tubular walls described in this application are of no significance, and they may be, e.g., cylindrical or multi-sided.

Contained within and spaced apart from the first tubular outer wall 20 is a first tubular inner wall 22 which together with the tubular outer wall 20 divides the first inner cavity 18 into a first inner chamber 24 and a first outer chamber 26.

Contained within the upper housing 16 is a second inner cavity 28 which is defined by a second tubular outer wall 30. Contained within and spaced apart from the second tubular outer wall 30 is a second tubular inner wall 32, which together with the second tubular outer wall 30 divides the second inner cavity 28 into a second inner chamber 34 and a second outer chamber 36. Surrounding and spaced apart from the second tubular outer wall 30 is a first sleeve wall 38 which together with the second tubular outer wall 30 defines a first sleeve 40. The first tubular outer wall 20 extends upwardly from the lower housing 12 and fits within sleeve 40 and is slidable within sleeve 40 and has provided therewith a sliding seal 42 around its entire upper end. Stops 43 mounted on the first tubular outer wall 20 and stops 44 mounted on the walls of the sleeve 40 protect the sliding seal 42 and limit the motion of the tubular upper wall 20 up and down within the sleeve 40. The upper end of the first tubular inner wall 22 is also provided with a sliding seal 45 which is in slidably sealing engagement with the outer surface of the second tubular inner wall 32, and has stops 46 which act in cooperation with the stops 47 mounted on the second tubular wall to limit the downward motion of the first tubular inner wall 22 with respect to the second tubular inner wall 32, to the same extent as stops 43, 44 described above.

Mounted at the bottom 21 of the inner cavity 18 of the lower housing 12 are a pair of turbines 48 having blades 49. In the upper portion of the upper housing 16 are mounted a pair of turbines 50 having blades 51. A funnel-like opening 52 in the upper portion of the upper housing 16 collects air flow due to the wind and directs it through an inlet passage 54 across the blades 51 of the turbines 50. The turbines 50 are mounted such that there is a very small clearance between the blades 51 of the respective turbines 50 or alternatively the turbines 50 may be mounted such that the blades 51 overlap under inlet passage 54. The inlet passage 54 in the upper housing 16 is defined by a flapper valve 55 which is pivotally mounted to the upper housing 16 and normally gravity biased in the open position with reverse air flow causing the flapper valve 55 to shut against a stop 57 in the upper portion 56 of the upper housing 16, as is shown on the right-hand side of FIG. 1. Air flow through the turbines 50 discharges through discharge opening 60 into the second inner chamber 34. The second inner chamber 34 has towards its lower end a flapper valve 62 which allows air flow from the second inner chamber 34 to the first inner chamber 24, where veins 64 form a narrowed opening 65 in the lower end of the first inner chamber 24 which directs the air flow across the blades 49 of the turbines 48. Air flow through the turbines 48 discharges into the first outer chamber 26 and flows through the second outer chamber 36 and through discharges 68 in the upper end of the second outer chamber 36 to assist in driving the blades 51 of the turbines 50. Air pressure from the wind in funnel-like opening 52 keeps a flapper valve 69, pivotally attached to the upper housing 16 shut across a first discharge opening 70. The turbulence created by the wind flowing around the upper housing 16 will cause a pressure differential between the funnel-like opening 52 and a discharge funnel-like opening 71 on the opposite side of the upper portion 56 of the upper housing 16, thus a flapper valve 73 pivotally connected to the upper housing 16 will be opened to allow air to discharge through a second discharge opening 72.

Also contained in the upper housing 16 are two auxiliary cavities 74 defined by an auxiliary cavity outer wall 76 which is tubular. Surrounding and spaced apart from the auxiliary cavity outer wall 76 is an auxiliary cavity sleeve wall 78 which together with the auxiliary cavity outer wall 76 defines an auxiliary cavity sleeve 80. A slide member 82 is associated with each auxiliary cavity 74 and includes a slide member inner wall 84, which is tubular, and a tubular slide member outer wall 86 surrounding and spaced apart from the slide member tubular inner wall 84, defining therebetween a slide member sleeve 88 as illustrated on the right-hand side of FIGS. 1, 2 and 3. The slide member outer wall 86 extends into auxiliary cavity sleeve 80 and has a sliding seal 90 along the top thereof. Stops 98 contained on the slide member outer wall 86 act in cooperation with stops 91 mounted in the auxiliary cavity sleeve 80 to limit the upward and downward motion of the slide member outer wall 86 within the auxiliary cavity sleeve 80. The auxiliary cavity inner wall 76 extends into the slide member sleeve 88 and the slide member inner wall 84 has a seal 92 at the top thereof which is in slidingly sealing engagement with the inner surface of the auxiliary cavity inner wall 76. The slide member 82 has a bottom 94 which closes off the end of the slide member 82. At the upper end of the auxiliary cavity 74 is mounted an auxiliary turbine 96 having blades 97. An inlet passage 98 is in fluid communication with a low pressure discharge 100 of the turbines 50 downstream of the discharge passage 68, and a discharge passage 102 also in fluid communication with low pressure discharge 100. A wall 104 separates the turbine 96 from the auxiliary cavity 74 leaving a first opening 106, having associated therewith a flapper valve 108 pivotally connected to the inner wall 76 of the auxiliary cavity 74, and a second opening 110 having associated therewith a flapper valve 112, pivotally connected to the inner wall 76 of the auxiliary cavity 74, which shuts against a stop 111.

The auxiliary slide member 82 may have a buoyant flotation member 114 attached to the bottom thereof. Interlocking clam shell fins 116 are pivotally connected to the outer wall 86 of the slide member 82 near the bottom thereof, and have attached thereto stops 118 which prevent the clam shell fins from pivoting to more than approximately the horizontal position shown in phantom at the right-hand side of FIG. 1.

In operation the power generator 10 according to the present invention operates as will hereinafter be described. The wind enters the funnel opening 52 in the upper portion 56 of the upper housing 16, and due to the turbulence around the upper housing 16 on the opposite side from funnel opening 52 in the direction of the wind flow, a lower pressure will exist in funnel opening 71. The air flow through the funnel opening 52 passes through inlet passage 54 across the blades of the turbines 50 turning these turbines to drive one or more electrical generators, not shown, which are connected to these turbines 50 by a suitable means well known in the art. The manner of mechanically connecting the turbines 48, 50 and 96 to some form of electrical generating means is well known in the art and forms no part of the present invention. The generators may, e.g., be coupled to the shaft of the turbines or may be made integral with the turbines so that rotation of the turbine blades, e.g., 49, 51 and 97 causes a generator rotor (not shown), integral with the portion of the turbine 48, 50 and 96 carrying the blades 49, 51 and 97, to rotate about a stator (not shown) associated with the rotor and contained within the rotor. The curved surfaces of the funnel-like opening 52 are designed to direct the horizontally moving air mass being pushed by the wind downwardly to enter the turbines 50 in an essentially vertical downward direction through inlet 54. Vertical downward air flow and force is thus available to drive the tubines 50 and 48 and to act on the bottom 21 of the inner cavity 18 of the lower housing to assist in the pumping action by pushing down on the lower housing 12. In accordance with the general concept of the present invention to convert the horizontal forces of the wind and the waves into vertical forces, the upper curved surface of the funnel-like opening 52, while diverting the horizontally moving wind to inlet 54, helps to uplift the upper housing 16 assisting in the creation of relative movement between the upper and lower housings 16, 12. The horizontal force of a wave and of the wind generates an uplifting force on the upper housing 16. In the case of the wind this is principally true due to the wind striking the steeply slanted portion 17 of the upper housing 16 and in the case of the waves this is principally true with respect to the slightly slanting portion of the upper housing 16 in the vicinity of the auxiliary sleeves 82 and the slanted upper portion of lower housing 12 in the vicinity of the cable 14 attachments. However, both wind and wave action will also affect both of the slanted portions. These conversions of horizontal wind and wave forces to vertical forces acting to assist in the relative movement of the upper and lower housings 12, 16, along with the passage of the wind forced air flow through several stages of turbines which are in turn assisted by the pumping action of the inner cavities 18, 28 of the upper and lower housings 16, 12 and the auxiliary cavities 74, provide for maximum utilization of all available energy in the wind and wave motion and all residual energy from each.

Figure 2:
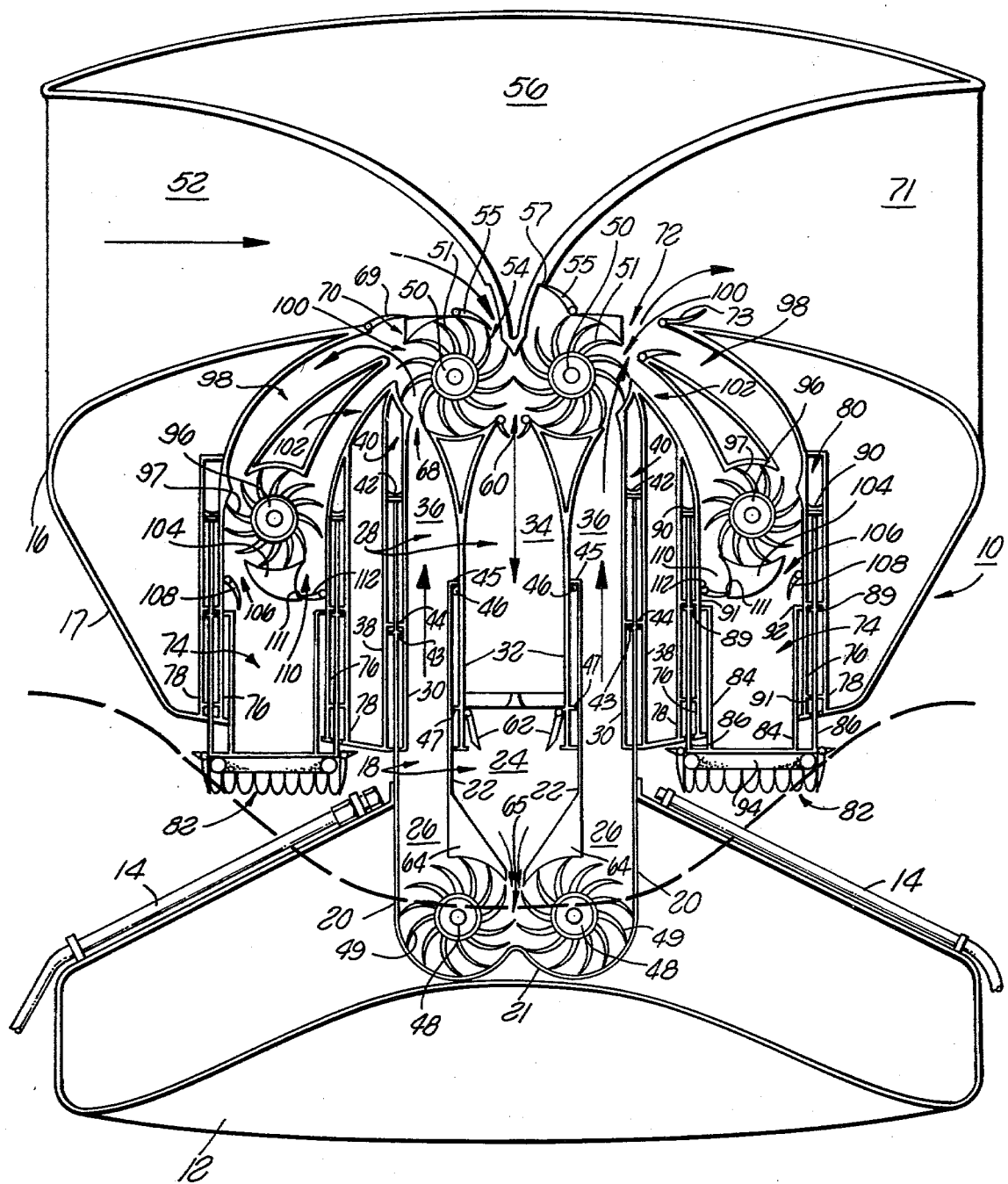
FIG. 2 shows the apparatus of FIG. 1 in the same view during a second phase in the operatin of the present invention; and, FIG. 3 shows the apparatus as shown in FIG. 1 during a third phase of the operation of the present invention.

Turning now to FIG. 2, the operation of the apparatus of the present invention on wind pressure alone is shown, which is the condition of operation during one phase of the operation of the apparatus between successive wave crests, when the relative motion between the upper and lower housings 16, 12 is zero and the upper housing 16 is in its lowest position with respect to the lower housing 12. Air pressure exiting the turbines 50 through discharge opening 60 enters the upper housing inner chamber 34 and passes through the open flapper valve 62 into the lower housing inner chamber 24 and thus into the narrow area 65 created by the vanes 64, striking the blades 49 of the turbines 48, turning these turbines, which are also connected to one or more electrical generators (not shown) by any suitable means well known in the art. Residual air pressure left over after the air flow exits the blades 49 of turbines 48 enters the outer chamber 26 of the lower housing and the air flow passes through the outer chamber 36 of the upper housing, and again is directed onto the blades 51 of the turbines 50 through the outer chamber discharge openings 68. In the case of the turbines 50 shown at the right hand-side of FIGS. 1, 2 and 3 a flapper valve 73 will be in the open position due to the low pressure in funnel opening 71, so that the air will discharge into funnel opening 71. However, with respect to the turbine 50 shown on the left-hand side of FIGS. 1, 2 and 3 flapper valve 69 will be shut by the air flow of the wind entering funnel 52 and thus any residual air pressure in the left-hand turbine 50 shown in FIGS. 1, 2 and 3 down stream of the outer chamber discharge 68 into the left-hand turbine 50, will enter the inlet passage 98 for the auxiliary turbine 96 shown on the left-hand side of FIGS. 1, 2 and 3.

As the crest of the wave shown in FIG. 2 in phantom strikes the upper housing 16, on the left-hand side in FIG. 2 the upper housing 16 will be driven upwardly with respect to the lower housing 12. As is shown in FIG. 1, wave action will force the slide member 82, associated with the turbine 96 on the left-hand side of FIGS. 1, 2 and 3, to rise along with the upper housing 16. The optional float member 114 is useful to assist in causing the slide member 82 to rise along with the upper housing 16 as the crest of the wave passes underneath the left-hand slide member 82. As the upper housing 16 moves upwardly with respect to the lower housing 12, the combined internal volumes of the inner cavity 24 of the lower housing 12 and 28 of the upper housing 16 expand. This decreases the pressure in the inner chamber 34 of the upper housing 16 and 24 of the lower housing 12, thereby assisting the wind air pressure in turning the turbines 50, by decreasing the pressure at the discharge opening 60. In addition, the decrease in pressure in outer chambers 26, 36 assists in turning the tubines 48 and creates a lower pressure at the outer chamber discharges 68 which further assists in turning the turbines 50.

The weight of the slide member 82 on the right-hand side of FIG. 1 will cause the slide member 82 to drop downwardly as shown in FIG. 2 when the upper housing 16 is lifted by the wave crest while the trough of the wave is passing underneath the slide member 82 on the right-hand side of FIG. 1. This increases the volume within the auxiliary cavity 74. The air flow into auxiliary cavity 74 will shut flapper valve 112 and air will be drawn through inlet passage 98 on the right-hand side of the upper housing 16 to drive the blades 97 of auxiliary turbine 96 on the right-hand side of FIG. 1. Flapper valve 108 in the right-hand auxiliary cavity 74 will be open allowing the flow through passage 106 from the discharge of the turbine 96 into the right-hand auxiliary cavity 74.

Figure 3:
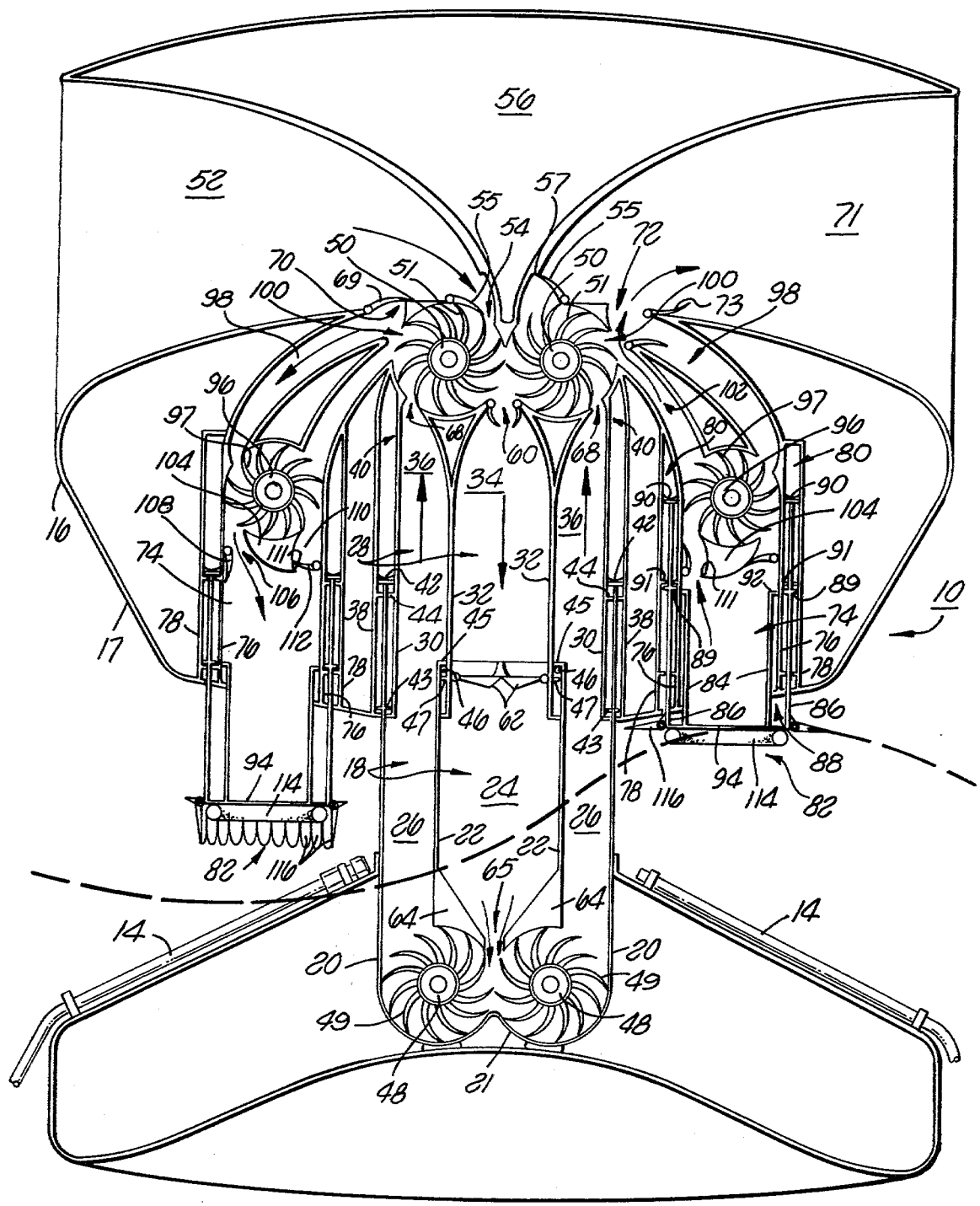

Turning now to FIG. 3, as the crest of the wave moves across the bottom of the upper housing 16 the sleeve member 82 associated with the auxiliary cavity 74 on the left-hand side of FIG. 3 will drop down of its own weight causing the auxiliary turbine 96 on the left-hand side to turn in the same manner as was described above for the auxiliary turbine 96 on the right-hand side in FIG. 1.

As the crest of the wave passes underneath the sleeve member 82 on the right-hand side of the upper housing 16 in the downward position of the right-hand side sleeve member 82 as shown in FIG. 2, the force of the water will cause the interlocking clam shell fins 116 to move upwardly to a generally horizontal position until stop members 118 strike the outer surface of the slide member outer wall 86, thereby increasing the bottom surface area of the slide member 82 bottom 94. This will cause the slide member 82 to be elevated by the waves passing below it. This may be further assisted by the optional float member 114 attached to the bottom of the right-hand slide member 82. FIG. 3 shows the right-hand slide member in the fully elevated position and as the crest of the wave passes by to the right. As the right-hand slide member 82 is being elevated, a pumping effect created by the decrease in volume of the auxiliary cavity 74 creates an air flow which will open flapper valve 112 forcing air across the blades 97 of turbine 96 of right-hand auxiliary cavity 74 through opening 110 and forcing shut the flapper valve 108 closing opening 106.

FIG. 3 also shows the operation of the apparatus of the present invention as the wave crest passes by to the right, as shown in FIG. 3, at the point where the lifting effect of the wave upon the upper housing 16 has ceased and the upper housing 16 begins its downward travel to the position shown in FIG. 2. As the upper housing 16 begins to move downwardly, the flapper valves 62 shut, due to the air flow between lower inner chamber 24 and upper inner chamber 34 forcing the flapper valve 62 shut, trapping the air in the inner chamber 24 of the inner cavity 18 of the lower housing 12, which inner chamber 24 is caused to decrease in volume by the downwad motion of the upper housing 16. This forces air through the narrow portion 65 between the vanes 64 and onto the blades 49 of the turbines 48.

Further waves passing by the apparatus of the present invention cause the same sequence of operation as wave force moves the upper housing 16 up and down with respect to the lower housing 12, thereby assisting in forcing air across the blades of the turbines 50 and the turbines 48. Further, the wave action causes the slide members 82 associated with the auxiliary turbines 96 to move up and down driving the auxiliary turbines 96.

In addition, the auxiliary slide members 82 in combination with the clam shells 116 operate to make the generator 10 sensitive to very small wave motions. In such an embodiment, the optional floats 114 would not be used. In operation, as small waves lapped against the sides of the upper housing 16, the horizontal motion of the waves pushing against the slanted side wall 17 of the upper housing 16 pushes the upper housing 16 vertically upwardly as tubular outer wall 20 slides in sleeve 40. The slide members 82 will then drop downwardly within the sleeves 80 due to the lifting action of the waves on the upper housing 16. The clam shell 114 will remain in the "at rest" position shown in FIG. 1. Wave action will then decrease its lift on the upper housing 16 causing it to settle back downwardly towards the lower housing 12. At this time the water action on the clam shells 114 will tend to open them to the position shown in phantom on the right-hand side of FIG. 1, thus assisting in the pumping action caused by the relative motion of the auxiliary slide members 82 and the upper housing 16 as the slide members 82 move upwardly within sleeves 80.

Due to the tubular walls 20 and 82 having sliding seals 42, 88, the vacuum created in the sleeves 40, 80 as the walls 20, 82 move downwardly therein would tend to impede the movement of the walls 20, 82 in the sleeves 40, 80 and thus the pumping operation of the present invention. Several alternative solutions to this problem exist. First, the sleeves 40, 80 could each be connected through an aperature (not shown) in the sleeve wall to a relatively large (in terms of volume with respect to the volume of the sleeve) reservoir (not shown) of oil contained within a portion of the interior of the upper housing 16. The sleeves themselves would then also be filled with oil, which also assists in lubrication of the seals 42, 88. As the walls 20, 82 move downwardly in the sleeves 40, 80 the oil from the reservoir fills the voided part of the sleeve 40, 80.

A second alternative is to provide an aperture (not shown) in the sleeve wall between the sleeve 40, 80 and the respective auxiliary cavity 74 or outer chamber 36. This will allow the sleeve 40, 80 to draw air from the outer chamber 36 or auxiliary cavity 74, respectively, which both avoids the sticking problem due to drawing a vacuum in the sleeve, as noted above, and assists in decreasing the pressure in the respective outer chamber 36 or auxiliary chamber 74 to assist in the pumping action described above.

Finally, the aperture in the wall of the sleeve 40, 80 could be placed near the respective tops thereof in the region adjacent the blades of the respective turbines 50, 96. In this way air drawn into the aperture as the walls 20, 86 slide downwardly in the sleeves 40, 80 will increase the pressure differential between the inlet 54, 106 portion to the turbines 50, 96 and the location of the respective aperture, and as the walls 20, 86 move upwardly in the sleeves 40, 80 the air will be pumped onto the surface of the turbine blades 51, 97 through the aperture.

SUMMARY OF ADVANTAGES AND SCOPE OF THE INVENTION

It will be appreciated that in constructing a natural forces energy generator according to the present invention, certain significant advantages are provided.

In particular, the wave motion which causes relative movement between the upper housing 16 and the lower housing 12, along with suitable proper valving, creates a pumping action due to the increase and decrease of the volume of the inner cavities 18, 28 in the upper and lower housings 16, 12, to assist the air flow due to the wind entering through funnel opening 52 in the upper housing 16 in driving the turbines 50 and turbines 48, and the wave action also creates relative movement between the slide members 82 and the upper housing 16, which increases and decreases the volume in the auxiliary cavities 74 to assist in driving the auxiliary turbines 96. Thus, both wind and wave energy is harnessed in the same apparatus to generate, e.g., electrical power through attaching electrical generators to the turbines 50 and 48 and the auxiliary turbines 96. Maximum utilization of the horizontal forces of the wind and wave motion are converted to vertical forces to drive the turbines or create the pumping action to assist in driving the turbines. No sea water is used to drive the turbines, thus minimizing the corrosion problem existing in the art.

The foregoing description of the invention has been directed to a particular preferred embodiment of the invention in accordance with the requirements of the Patent Statutes and for purposes of explanation and illustration. It will be apparent, however, to those skilled in this art that many modifications and changes in both the apparatus and method may be made without departing from the scope and spirit of the invention. It will be further apparent that the invention may also be utilized with suitable modifications within the state of the art which will also be apparent to those skilled in this art. It is the Applicant's intention in the following claims to cover all such equivalent modifications and variations as fall within the true spirit and scope of the invention.

What is claimed is:

1. An apparatus for harnessing both wind and wave energy comprising:
   a first housing having a first internal cavity having a lower end and with at least one turbine rotatably mounted in said lower end;
   a buoyant second housing slidably mounted on said first housing and having a second internal cavity in fluid communication with said first internal cavity, said second internal cavity having an upper end;
   at least one turbine rotatably mounted in said upper end;
   an inlet passage in said second housing which gathers wind driven air flow and directs it onto said at least one turbine in said upper end;
   said first and second cavities each being divided respectively, into an outer and inner chamber in fluid communication with the inner chamber in said first inner cavity being in fluid communication with the inner chamber of said second inner cavity and the outer chamber of said first inner cavity being in fluid communication with the outer chamber in said second inner cavity;
   a one-way flow valve mounted in said second internal cavity so as to prevent air flow between said inner chambers when said second housing is moving downwardly toward said first housing.

2. An apparatus for harnessing both wind and wave energy comprising:
   a first housing;
   means for fixing said first housing at a preselected height above the bottom of a body of water and below the surface of the water;
   said first housing having a first inner cavity defined by a first tubular outer wall, said first tubular outer wall extending upwardly from said first housing, and said first inner cavity having a first tubular inner wall contained within and spaced apart from said first tubular outer wall, dividing said first inner cavity into a first inner chamber, contained within said first tubular inner wall, and a first outer chamber contained between said first inner and outer tubular walls;
   a second buoyant housing having a second inner cavity defined by a second tubular outer wall, said second inner cavity having a second tubular inner wall contained within and spaced from said second tubular outer wall, dividing said second inner cavity into a second inner chamber contained within said second tubular inner wall and a second outer chamber between said second inner and outer tubular walls;
   a first sleeve wall contained in said second housing and surrounding and spaced apart from said second tubular outer wall, defining a first sleeve therebetween;
   the portion of said first tubular outer wall extending upwardly from said first housing fitting in slidably sealing engagement within said sleeve;
   said first tubular inner wall having an inner surface and an upper end, and said second inner wall having an outer surface, and said inner surface being in slidably sealing engagement with said outer surface at generally said upper end of said first tubular inner wall;
   said first inner cavity having a bottom portion containing at least one turbine;
   said second housing having at least one turbine contained therein;
   at least one inlet passage in said second housing for gathering wind driven air flow and directing it onto said at least one turbine in said second housing;
   said at least one turbine in said second housing having a low pressure discharge in fluid communication with said second inner chamber;
   said second inner chamber having a first lower end and a one-way flow valve at said first lower end to allow fluid flow from said second inner chamber to said first inner chamber but prevent fluid flow from said first inner chamber to said second inner chamber;
   said first inner chamber having a second lower end;
   a narrowed portion at said second lower end adapted to direct the flow of fluid contained in said first inner chamber to impinge upon and rotate said at least one turbine in said lower housing;
   said at least one turbine in said lower housing having a low pressure discharge in fluid communication with said first outer chamber; and
   said second outer chamber having a first discharge opening directing fluid flow to assist in rotating said at least one turbine in said second housing.

3. The apparatus of claim 2 wherein said at least one turbine in said second housing includes two turbines and said inlet passage directs wind generated fluid flow onto both of said two turbines; and,
   said second outer chamber has a first discharge directing fluid flow to assist in rotating one of said two turbines and a second discharge opening directing fluid flow onto the other of said two turbines.

4. The apparatus of claim 3 wherein each said turbine is mechanically connected with an electrical generator for generating electricity.

5. The apparatus of claim 2 further comprising:
   at least one auxiliary cavity defined by a third tubular outer wall, said third tubular outer wall being surrounded by a second tubular sleeve wall spaced apart from said third tubular outer wall forming a second sleeve therebetween;
   a tubular slide member having a fourth tubular outer wall and a third tubular inner wall contained within and spaced apart from said fourth tubular outer wall and defining a third sleeve therebetween;
   said third tubular outer wall fitting in slidably sealing engagement within said third sleeve and said fourth tubular outer wall fitting in slidably sealing engagement within said second sleeve;

said slide member having a lower end and being sealed at said lower end;

said at least one auxiliary chamber having an upper end and containing an auxiliary turbine in said upper end and having an inlet passage in fluid communication with a low pressure discharge of said at least one turbine in said second housing, downstream of said first discharge opening of said second outer chamber, and a low pressure discharge passage in fluid communication with said low pressure discharge of said at least one turbine in said second housing;

said auxiliary turbine being in fluid communication with said auxiliary cavity through a first opening and a second opening;

said first opening having associated therewith a flapper valve for preventing fluid flow from said auxiliary cavity onto said auxiliary turbine in response to upward movement of said slide member with respect to said second housing and said second opening having associated therewith a flapper valve for preventing fluid flow from said auxiliary turbine into said auxiliary cavity in response to downward movement of said slide member with respect to said second housing.

6. The apparatus of claim 5 wherein said slide member has a flotation portion at said lower end of sufficient buoyancy to cause said slide member to float.

* * * * *